Feb. 22, 1927. 1,618,234
M. B. SKINNER
PIPE CLAMP
Filed Feb. 19, 1923
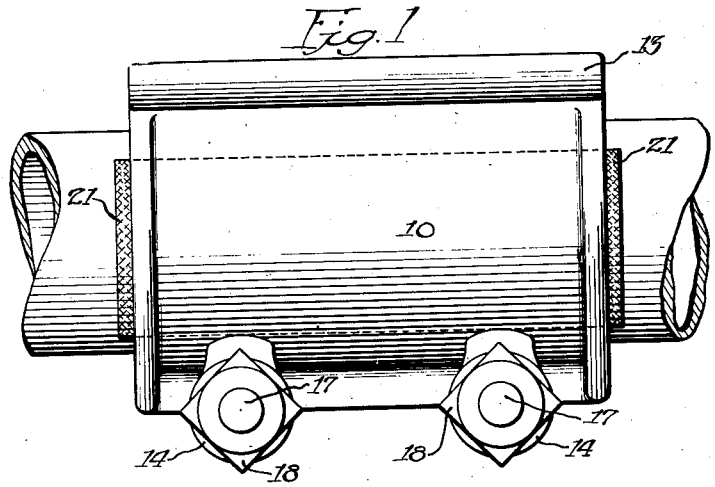
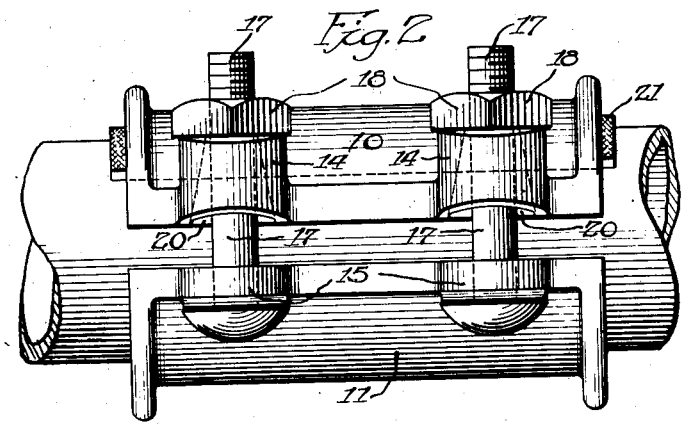
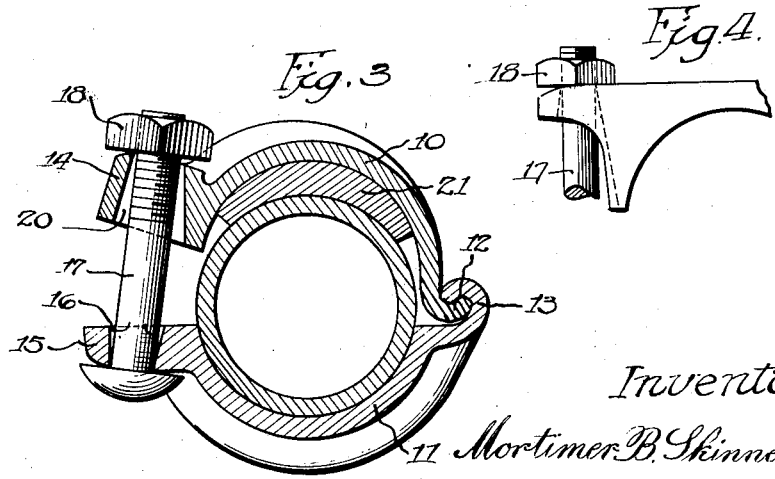
Inventor
Mortimer B. Skinner
By Luther Johns, Atty.

Patented Feb. 22, 1927.

1,618,234

UNITED STATES PATENT OFFICE.

MORTIMER B. SKINNER, OF WILMETTE, ILLINOIS.

PIPE CLAMP.

Application filed February 19, 1923. Serial No. 619,829.

The present improvements relate to pipe clamps of the kind designed for closing breaks in pipes containing pressure. Its principal object is to improve the construction and efficiency of the device illustrated in the patent to Augensen, No. 799,623 of September 19, 1905. The improvement is based largely on the fact that such clamps are emergency devices, frequently being called into use in difficultly accessible places and at times when packing material of certain ordinarily-desired thickness is not available and it becomes necessary to use as packing a section of a rubber or leather belt or other unusually thick material. Some users, however, prefer a relatively thick packing in any event.

The Augensen device mentioned, while of notable utility in the ease and celerity of its application, particularly in locations which are fairly easily accessible, is not adapted to the use of relatively thick packing, and considerable difficulty has been experienced in its application, even under the best circumstances, due to the fact that the nuts engaging the clamp extensions are positioned so close to a body member that the nut-applying and nut-turning operations are not easy.

In the accompanying drawings, which form a part of this specification, Figure 1 is a top view of my improved device as applied to a pipe section; Fig. 2 is a side view thereof as it would appear with packing of ordinary thickness used therewith; Fig. 3 is a cross-sectional view through one of the clamping extensions showing bolt-hole construction and the relative position of the parts when fairly thick packing is employed; and Fig. 4 is a fragment showing a modification of one extension part.

The device comprises two body members 10 and 11 extending longitudinally of the pipe to be clamped and being formed to encompass such pipe to a materially large extent. At one side of the device is an interlocking connection comprising a rib-like member 12 on the body member 10 and a socket-forming extension 13 extending well around the rib 12 and forming a hinge-like connection the parts of which may readily be separated from or applied to each other. While I have improved the mechanical construction of this detail over the Augensen disclosure also its effect is substantially that provided by the older device.

Opposite the interlocking connection the body member 10 carries a pair of extensions 14, and the body member 11 carries a pair of extensions 15 similarly positioned, these extensions 15 being opposite the extensions 14 respectively. Each of the extensions 15 is provided with a square hole at 16, Fig. 3, to accommodate square-shanked bolts 17 respectively.

The extensions 14 are materially thick in the longitudinal direction of the bolts 17 and their surfaces contacted by the nuts 18 respectively are thus carried well away from the curving side wall of the body member 10 and are at a place at which the nuts pressing against them respectively are materially free to be engaged by a wrench. This feature is quite important in view of the emergency character of the device. With steam or hot water issuing from a bursted pipe the application of the device so as to stop the leak often calls for the most rapid work possible, in addition to which urgency is the danger and discomfort to the workman from the presence of the water or steam. The leak is not effectively stopped until the nuts are well tightened to produce the desired clamping effect. With the nuts thus positioned well out in the open relative to the clamp body the workman can perform the desired clamping operation much more rapidly and effectively than where the nuts are located as in the Augensen device.

It will well be noted from Fig. 3 that the bolt-hole 20 in the thickened extension 14 is materially enlarged inwardly, that is toward the pipe held by the clamp, and this enlargement is made for the sake of clearance so that when a relatively large piece of packing such as 21, Fig. 3, is employed, causing the body members to stand apart at their free edges quite widely, the bolt may extend through the hole 20 without binding. A further advantage results from the enlarged-hole construction, namely, that before the body members are drawn together even as much as appears to be the case in Fig. 3 they must be held temporarily in position while the bolts are being inserted, and the bolt-hole enlargement (which may well be in lateral directions also, as shown in Fig. 2) provides first a free entrance for the bolt, and then the walls defining the hole 20 naturally lead the bolt to the outer opening of the hole, and thus this initial operation, frequently performed in a difficultly accessible place and in the presence of steam or spouting water, is rendered much more rapid and simple.

The fragment of Fig. 4 shows a modification in which the nut-engaging surface of the extension is level with what may be termed the highest point or line of the body member carrying it.

In view of the fact that the bolt will have a different angular relation to the body members according to the thickness of the packing employed, the surfaces of the extensions 14 and 15 which are contacted by the bolt head and nut respectively may be rounded slightly in the outward direction, as well seen in Fig. 3, to give the bolt head and nut solid impingement on the material of the extensions immediately adjacent to the bolt holes therethrough.

In my practice the clamp members are made of malleable iron.

Such modifications are also contemplated as fall within the scope of the appended claim.

I claim:

A pipe clamp of the character described comprising a pair of complemental body members mounted to swing toward and away from each other with a readily releasable hinge-like connection and to encompass a pipe to a substantially large extent, opposed projections at the sides of the body members opposite the hinge-like connection, the opposed projections being apertured in a line to receive a bolt having a threaded end and a nut thereon, one of the projections being substantially long in the direction of the bolt, the substantially long projection being adapted to receive the threaded end of the bolt and having a substantially conical bolt hole therethrough substantially wide where the bolt normally enters it to provide clearance for the bolt when packing of various thicknesses is used with the device and to facilitate rapid assembly of the body members in emergencies, the substantially long projection having a nut-engaging surface about the smaller end of said bolt hole and at a place substantially out in the open with respect to the associated body member to provide for free manipulation of the nut with a wrench.

MORTIMER B. SKINNER.